(12) United States Patent
Bohling et al.

(10) Patent No.: US 8,877,852 B2
(45) Date of Patent: Nov. 4, 2014

(54) PHOSPHOROUS-CONTAINING ORGANIC POLYMER AND COMPOSITIONS AND PROCESSES INCLUDING SAME

(75) Inventors: James Charles Bohling, Lansdale, PA (US); Matthew Stewart Gebhard, Cary, IL (US); Thomas Glenn Madle, Flourtown, PA (US); Alvin Michael Maurice, Lansdale, PA (US); Robert Joseph Pafford, IV, Langhorne, PA (US); William Douglas Rohrbach, Perkasie, PA (US)

(73) Assignee: Rohm and Haas Company, Philadelphia, PA (US)

( * ) Notice: Subject to any disclaimer, the term of this patent is extended or adjusted under 35 U.S.C. 154(b) by 935 days.

(21) Appl. No.: 11/998,911

(22) Filed: Dec. 3, 2007

(65) Prior Publication Data
US 2008/0146724 A1 Jun. 19, 2008

Related U.S. Application Data

(60) Provisional application No. 60/875,228, filed on Dec. 15, 2006.

(51) Int. Cl.
| | | |
|---|---|---|
| *C08L 43/02* | (2006.01) | |
| *C08K 9/00* | (2006.01) | |
| *C08F 2/22* | (2006.01) | |
| *C08F 230/02* | (2006.01) | |
| *C08F 220/14* | (2006.01) | |
| *C08F 220/18* | (2006.01) | |
| *C08F 220/06* | (2006.01) | |

(52) U.S. Cl.
CPC .............. *C08F 2/22* (2013.01); *C08F 220/18* (2013.01); *C08F 220/06* (2013.01); *C08F 230/02* (2013.01); *C08F 220/14* (2013.01)
USPC ............ 524/500; 524/610; 525/538; 528/392

(58) Field of Classification Search
USPC .......... 106/436; 524/375, 376, 413, 414, 416, 524/419, 432, 435, 425, 497, 500, 504, 505, 524/547, 556, 558, 610, 804, 832; 523/205, 523/206, 210; 525/538; 528/392
See application file for complete search history.

(56) References Cited

U.S. PATENT DOCUMENTS

| | | | |
|---|---|---|---|
| 4,891,401 A | 1/1990 | Huybrechts et al. | |
| 5,151,125 A | 9/1992 | Kuwajima et al. | |
| 5,385,960 A | 1/1995 | Emmons et al. | |
| 5,530,070 A | 6/1996 | Antonelli et al. | |
| 6,218,456 B1 | 4/2001 | Schlarb et al. | |
| 6,419,990 B1 | 7/2002 | Yukawa et al. | |
| 6,545,084 B2 * | 4/2003 | Brown et al. ................. | 524/556 |
| 6,576,051 B2 * | 6/2003 | Bardman et al. ............. | 106/436 |
| 7,265,166 B2 * | 9/2007 | Gebhard et al. ............. | 523/205 |
| 2003/0144399 A1 * | 7/2003 | Matta et al. .................. | 524/419 |
| 2005/0009954 A1 * | 1/2005 | Gebhard et al. ............. | 523/210 |
| 2005/0222299 A1 * | 10/2005 | Garzon et al. ................ | 523/407 |

FOREIGN PATENT DOCUMENTS

| | | |
|---|---|---|
| EP | 1 209 191 A2 | 5/2002 |
| EP | 1 302 515 A2 | 4/2003 |
| EP | 1 496 091 A1 | 1/2005 |
| EP | 1 1746 137 A1 | 1/2007 |

OTHER PUBLICATIONS

M.J.Chen et al, "Phosphate Monomers as Adhesion Promoters and Latex Stabilizers", Proceedings of the Annual Meeting Technical Program of the FSCT, Oct. 2000, pp. 313-326.

* cited by examiner

*Primary Examiner* — Ling Choi
*Assistant Examiner* — Chun-Cheng Wang
(74) *Attorney, Agent, or Firm* — Karl E. Stauss; Ronald D. Bakule

(57) ABSTRACT

An organic polymer including internal pendant phosphorous acid groups at a level of >0.25% phosphorus by weight based on the weight of said organic polymer, the phosphorus acid groups being separated from the backbone of the organic polymer by no more than 2 alkylene glycol units, the organic polymer having an acid number of from 100 to 1,000, and a Mw of from 1,000 to 75,000, wherein the organic polymer has been formed by emulsion polymerization from at least one ethylenically unsaturated monomer is provided. Compositions further including an emulsion polymer including from 0.05% to 2% phosphorous, present as pendant phosphorous acid groups, by weight based on the weight of the emulsion polymer, and, optionally, an inorganic particle are also provided as are processes related to the compositions.

2 Claims, No Drawings

PHOSPHOROUS-CONTAINING ORGANIC POLYMER AND COMPOSITIONS AND PROCESSES INCLUDING SAME

This application claims the benefit of priority under 35 U.S.C. §119(e) of U.S. patent application Ser. No. 60/875,228, filed on Dec. 15, 2006, the disclosure of which is incorporated herein by reference This invention relates to a phosphorous-containing organic polymer and compositions and processes including phosphorous-containing organic polymers and certain emulsion polymers having pendant phosphorous acid groups, optionally in combination with inorganic particles. More particularly, this invention relates to an organic polymer including internal pendant phosphorous acid groups at a level of >0.25% phosphorus by weight based on the weight of the organic polymer, the phosphorus acid groups being separated from the backbone of the organic polymer by no more than 2 alkylene glycol units, the organic polymer having an acid number of from 100 to 1,000, and the organic polymer having a Mw of from 1,000 to 75,000; wherein the organic polymer has been formed by emulsion polymerization from at least one ethylenically unsaturated monomer. Further, the present invention is related to a process whereby inorganic particles are contacted with certain phosphorous-containing organic polymer to which admixture subsequently certain emulsion polymers having pendant phosphorous acid groups are added. The present invention serves, in part, to provide a phosphorous-containing organic polymer which is useful as a dispersant polymer for inorganic particles wherein the formed dispersion is particularly useful in compositions including certain emulsion polymers having pendant phosphorous acid groups.

U.S. Pat. No. 6,218,456 discloses an aqueous polymer dispersion obtainable by emulsion polymerization of a monomer mixture including optionally less than 10% by weight of monomers having at least one phosphate or phosphonate group in the presence of a protective colloid including from 2 to 40% by weight of monomers having at least one phosphate or phosphonate group. However, improved compositions including inorganic particles and emulsion polymers containing phosphorous acid groups are still desired. When aqueous compositions such as, for example, pigmented coatings or paints are prepared using an emulsion polymer containing phosphorous acid groups and an inorganic particle such as $TiO_2$ particles, as is common practice in the coating arts, undesirable grit particles are sometimes formed. Without being bound by a particular theory, it is believed that the presence of the emulsion polymer containing phosphorous acid groups may contribute to the inorganic filler becoming aggregated in the form of macroscopic grit particles. When the aqueous compositions and processes of the present invention are used, coatings can be prepared with no or minimal generation of macroscopic grit particles.

In a first aspect of the present invention, there is provided an organic polymer comprising internal pendant phosphorous acid groups at a level of >0.25% phosphorus by weight based on the weight of said polymer, said phosphorus acid groups being separated from the backbone of said polymer by no more than 2 alkylene glycol units, said polymer having an acid number of from 100 to 1,000, and said polymer having a Mw of from 1,000 to 75,000; wherein said polymer has been formed by emulsion polymerization from at least one ethylenically unsaturated monomer.

In a second aspect of the present invention, there is provided an aqueous composition comprising an inorganic particle; an organic polymer comprising phosphorous acid groups at a level of >0.25% phosphorus by weight based on the weight of said organic polymer, said organic polymer having an acid number of from 50 to 1,000, and said organic polymer having a Mw of from 1,000 to 75,000, wherein said organic polymer is present at a level of from 0.2 to 10% by weight based on the weight of said inorganic particle; and an emulsion polymer comprising from 0.05% to 2% phosphorous, present as pendant phosphorous acid groups, by weight based on the weight of said emulsion polymer, wherein said organic polymer is present at a level of from 0.1% to 50% by weight based on the total weights of said organic polymer and said emulsion polymer; wherein said pigment has been first contacted with said organic polymer and subsequently said emulsion polymer has been added to form said aqueous composition.

In a third aspect of the present invention, there is provided a process for forming an aqueous composition comprising: a) providing an inorganic particle; b) contacting said inorganic particle in an aqueous medium with an organic polymer comprising phosphorous acid groups at a level of >0.25% phosphorus by weight based on the weight of said organic polymer, said organic polymer having an acid number of from 50 to 1,000, and said organic polymer having a Mw of from 1,000 to 75,000; wherein said organic polymer is present at a level of from 0.2 to 10% by weight based on the weight of said inorganic particle; and c) subsequently adding an emulsion polymer comprising from 0.05% to 2% phosphorous, present as pendant phosphorous acid groups, by weight based on the weight of said emulsion polymer, wherein said organic polymer is present from 0.1% to 50% of said composition based on the total weights of said organic polymer and said emulsion polymer.

In a fourth aspect of the present invention, there is provided a process for forming an aqueous dispersion comprising: a) providing an inorganic particle; and b) contacting said inorganic particle in an aqueous medium with an organic polymer comprising internal pendant phosphorous acid groups at a level of >0.25% phosphorus by weight based on the weight of said organic polymer, said phosphorus acid groups being separated from the backbone of said organic polymer by no more than 2 alkylene glycol units, said organic polymer having an acid number of from 100 to 1,000, and said organic polymer having a Mw of from 1,000 to 75,000; wherein said organic polymer has been formed by emulsion polymerization from at least one ethylenically unsaturated monomer; wherein said organic polymer is present at a level of from 0.2 to 10% by weight based on the weight of said inorganic particle.

The organic polymer of the present invention includes internal pendant phosphorous acid groups at a level of >0.25%, preferably from >0.25% to 9%, and more preferably from 0.5% to 5%, phosphorus by weight based on the weight of the organic polymer, the phosphorus acid groups being separated from the backbone of the organic polymer by no more than 2 alkylene glycol units, the organic polymer having an acid number of from 100 to 1,000, preferably from 100 to 800, and the organic polymer having a Mw of from 1,000 to 75,000, preferably from 1,500 to 50,000, and more preferably from 2,000 to 20,000; wherein the polymer has been formed by emulsion polymerization from at least one ethylenically unsaturated monomer. Internal pendant phosphorous acid group is defined herein as a phosphorous acid group which is covalently linked to the polymer backbone and is not at the end of the polymer chain. The latter can occur when a phosphorous-containing initiator or chain regulating agent is used.

The organic polymer of this invention has on average at least one internal pendant phosphorous acid group per molecule which is typically introduced through the use of a copolymerizable monomer which contains a phosphorous acid group, or by reacting an organic polymer which contains a pendant first coreactive group which can be reacted with a compound containing a second coreactive group and a phosphorous acid group. Some of the polymer chains may also contain pendant phosphorous acid groups at the end of the chain which will occur in any random copolymerization. In addition, phosphorous-containing initiators or chain regulating agents may be used along with a copolymerizable monomer which contains a pendant phosphorous acid group.

The organic polymer of the present invention has an acid number of from 100 to 1,000, and the organic polymer has a weight average molecular weight, Mw, of from 1,000 to 75,000. "Acid Number" herein is the mg of KOH required to neutralize 1 g of solid polymer. "Mw" herein is weight average molecular weight as determined by Aqueous Gel Permeation Chromatography measured vs. polyacrylic acid standards.

In one embodiment of the present invention, an aqueous composition is provided including the organic polymer of this invention and an emulsion polymer including from 0.05% to 2%, preferably from 0.15% to 1%, and more preferably from 0.15% to 0.45%, phosphorous, present as pendant phosphorous acid groups, by weight based on the weight of the emulsion polymer, wherein the organic polymer is present from 0.1% to 50%, preferably from 0.25% to 10%, and more preferably from 0.5% to 5%, by weight based on the total weights of the organic polymer and the emulsion polymer.

The organic polymer of this invention and the phosphorous acid group-containing emulsion polymer used in certain compositions and processes of this invention are prepared by emulsion polymerization. Each typically includes, in addition to a phosphorous acid monomer, at least one copolymerized ethylenically unsaturated monomer not containing a phosphorous acid group such as, for example, a (meth)acrylic ester monomer including methyl (meth)acrylate, ethyl (meth)acrylate, butyl (meth)acrylate, 2-ethylhexyl (meth)acrylate, decyl (meth)acrylate, hydroxyethyl (meth)acrylate, hydroxypropyl (meth)acrylate, ureido-functional (meth)acrylates and acetoacetates, acetamides or cyanoacetates of (meth) acrylic acid; styrene or substituted styrenes; vinyl toluene; butadiene; vinyl acetate or other vinyl esters; vinyl monomers such as vinyl chloride, vinylidene chloride, N-vinyl pyrollidone; (meth)acrylonitrile; and N-alkylol (meth)acrylamide. The use of the term "(meth)" followed by another term such as (meth)acrylate or (meth)acrylamide, as used throughout the disclosure, refers to both acrylates or acrylamides and methacrylates and methacrylamides, respectively. In certain embodiments, the emulsion polymer includes less than 5 wt %, or in the alternative, less than 0.1 wt %, based on the weight of the polymer, of a copolymerized multi-ethylenically unsaturated monomer. Multi-ethylenically unsaturated monomers include, for example, allyl (meth)acrylate, diallyl phthalate, 1,4-butylene glycol di(meth)acrylate, 1,2-ethylene glycol di(meth)acrylate, 1,6-hexanediol di(meth)acrylate, and divinyl benzene.

Each polymer may include a copolymerized monoethylenically-unsaturated carboxylic acid monomer. Carboxylic acid monomers include, for example, (meth)acrylic acid, crotonic acid, itaconic acid, fumaric acid, maleic acid, monomethyl itaconate, monomethyl fumarate, monobutyl fumarate, and maleic anhydride. In some embodiments of the organic polymer, copolymerized carboxylic acid monomers are included, at a level such as to provide an acid number contribution of greater than 70.

The phosphorus acid monomer contains at least one ethylenic unsaturation and a phosphorus acid group. The phosphorus acid monomer may be in the acid form or as a salt of the phosphorus acid groups. Examples of phosphorus acid monomers include:

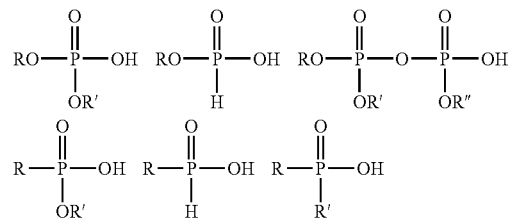

wherein R is an organic group containing an acryloxy, methacryloxy, or a vinyl group; and R' and R" are independently selected from H and a second organic group. The second organic group may be saturated or unsaturated.

Suitable phosphorus acid monomers include dihydrogen phosphate-functional monomers such as dihydrogen phosphate esters of an alcohol in which the alcohol also contains a polymerizable vinyl or olefinic group, such as allyl phosphate, mono- or diphosphate of bis(hydroxy-methyl) fumarate or itaconate, derivatives of (meth)acrylic acid esters, such as, for examples phosphates of hydroxyalkyl(meth)acrylates including 2-hydroxyethyl (meth)acrylate, 3-hydroxypropyl (meth)acrylates, and the like. Other suitable phosphorus acid monomers are phosphonate functional monomers, disclosed in WO 99/25780 A1, and include vinyl phosphonic acid, allyl phosphonic acid, 2-acrylamido-2-methylpropanephosphonic acid, α-phosphonostyrene, 2-methylacrylamido-2-methylpropanephosphonic acid. Further suitable phosphorus functional monomers are 1,2-ethylenically unsaturated (hydroxy) phosphinylalkyl (meth)acrylate monomers, disclosed in U.S. Pat. No. 4,733,005, and include (hydroxy)phosphinylmethyl methacrylate. Preferred phosphorus acid monomers are dihydrogen phosphate monomers, which include 2-phosphoethyl (meth)acrylate, 2-phosphopropyl (meth)acrylate, 3-phosphopropyl (meth)acrylate, and 3-phospho-2-hydroxypropyl (meth)acrylate.

The emulsion polymerization techniques used to prepare the organic polymer and the aqueous emulsion polymer are well known in the art such as, for example, as disclosed in U.S. Pat. Nos. 4,325,856; 4,654,397; and 4,814,373. Conventional surfactants may be used such as, for example, anionic and/or nonionic emulsifiers such as, for example, alkali metal or ammonium alkyl sulfates, alkyl sulfonic acids, fatty acids, and oxyethylated alkyl phenols. The amount of surfactant used is usually 0.1% to 6% by weight, based on the weight of total monomer. Either thermal or redox initiation processes may be used. Conventional free radical initiators may be used such as, for example, hydrogen peroxide, t-butyl hydroperoxide, t-amyl hydroperoxide, ammonium and/or alkali persulfates, typically at a level of 0.01% to 3.0% by weight, based on the weight of total monomer. Redox systems using the same initiators coupled with a suitable reductant such as, for example, sodium sulfoxylate formaldehyde, sodium hydrosulfite, isoascorbic acid, hydroxylamine sulfate and sodium bisulfite may be used at similar levels, optionally in combination with metal ions such as, for example iron and copper, optionally further including complexing agents for the metal. Chain transfer agents such as mercaptans may be used to lower the molecular weight of the polymers. The monomer mixture may be added neat or as an emulsion in water. The monomer mixture may be added in a single addition or in multiple additions or continuously over the reaction period using a uniform or varying composition. Additional ingredients such as, for example, free radical initiators, oxidants, reducing agents, chain transfer agents, neutralizers, surfactants, and dispersants may be added prior to, during, or subsequent to any of the stages. Processes yielding polymodal particle size distributions such as those disclosed in U.S. Pat. Nos. 4,384,056 and 4,539,361, for example, may be employed.

In one embodiment, the aqueous composition contains a photosensitive moiety that is capable of absorbing some portion of the solar light spectrum and, without being bound by a particular theory, acting as a photoinitiator for crosslinking of the composition during exterior exposure. The photosensitive moiety may be a photosensitive compound added to the aqueous polymer composition, or a photosensitive group that is chemically incorporated into the polymer composition, for example, by copolymerization. Examples of photosensitive compounds are benzophenone derivatives wherein one or both of the phenyl rings may be substituted such as, for example, benzophenone, 4-methyl benzophenone, 4-hydroxy benzophenone, 4-amino benzophenone, 4-chloro benzophenone, 4-hydroxycarboxyl benzophenone, 4,4'-dimethyl benzophenone, 4,4'-dichloro benzophenone, 4-carboxymethyl benzophenone, 3-nitro benzophenone, substituted phenyl ketones such as substituted phenyl acetophenones. The photosensitive groups may be present as copolymerized ethylenically unsaturated monomers that contain photosensitive groups. These may be copolymerized into the organic polymer or the emulsion polymer or both. Examples of ethylenically unsaturated monomers that contain photosensitive groups include, allyl benzoylbenxoates and monomers incorporating pendant benzophenone groups, such as vinylbenzyl methylbenzoylbenzoate, hydroxymethacryloxypropyl methylbenzoylbenzoate, hydroxymethacryloxypropyl benzoylbenzoate, and hydroxymethacryloxy-propoxy benzophenone. The aqueous polymer composition may contain from 0.1 to 5 wt %, preferably from 0.1 to 3 wt %, and more preferably, 0.1 to 1 wt % of one or more photosensitive compounds, based on the total polymer weight. Preferred is benzophenone.

In another embodiment of this invention the emulsion polymer contains as polymerized units,
 a) From 80 to 99.8% by weight of at least one ethylenically unsaturated vinyl monomer
 b) from 0.2 to 20% by weight of a compound of formula (i)

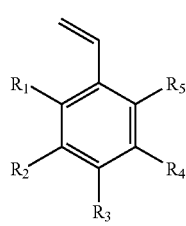

(i)

wherein $R_1$, $R_2$, $R_3$, $R_4$ and $R_5$ are selected from the group consisting of H and $C_1$-$C_4$ alkyl, with the proviso that at least one of $R_1$, $R_2$, $R_3$, $R_4$ and $R_5$ is $C_1$-$C_4$ alkyl. Preferred compounds of formula (i) are those wherein at least one of $R_1$, $R_2$, $R_3$, $R_4$ and $R_5$ is $C_1$-$C_2$ alkyl. Suitable compounds of formula (i) include methylstyrene, ethylstyrene, dimethylstyrene, diethylstyrene and trimethylstyrene. The more preferred compounds of formula (i) are those wherein only one of $R_1$, $R_2$, $R_3$, $R_4$ and $R_5$ are methyl, and the remainder are hydrogen; such a compound is referred to as "methylstyrene", which may be a single isomer, or a mixture of more than one isomer. Methylstyrene is often made available as "vinyltoluene" as a mixture of isomers.

In another embodiment of the present invention, the aqueous emulsion polymer may be prepared by a multistage emulsion polymerization process, in which at least two stages differing in composition are polymerized in sequential fashion. Such a process usually results in the formation of at least two mutually incompatible polymer compositions, thereby resulting in the formation of at least two phases within the polymer particles. Such particles are composed of two or more phases of various geometries such as, for example, core/shell or core/sheath particles, core/shell particles with shell phases incompletely encapsulating the core, core/shell particles with a multiplicity of cores, and interpenetrating network particles. In all of these cases, the majority of the surface area of the particle will be occupied by at least one outer phase and the interior of the particle will be occupied by at least one inner phase. Each of the stages of the multi-staged emulsion polymer may contain the same monomers, surfactants, chain transfer agents, etc. as disclosed herein-above for the emulsion polymer. For a multi-staged emulsion polymer, the phosphorous content shall be determined from the overall composition of the emulsion polymer without regard for the number of stages or phases therein. The polymerization techniques used to prepare such multistage emulsion polymers are well known in the art such as, for example, U.S. Pat. Nos. 4,325,856; 4,654,397; and 4,814,373. In this embodiment, the multistage emulsion polymer contains a copolymerized phosphorus acid monomer in at least one of the stages. In one embodiment, the multistage emulsion polymer comprises at least two polymer stages I and II, where stage I has a Tg at least 10° C. higher than stage II, preferably at least 30° C. higher than stage II, and more preferably at least 50° C. higher than stage II. The multistage emulsion polymer contains 2% by weight to 70% by weight of stage I based on the total weight of stage I and stage II. In one preferred embodiment, the multistage polymer is prepared using a process as disclosed in U.S. Pat. No. 4,814,373.

In another embodiment, the organic polymer of this invention is prepared by first preparing a precursor polymer which contains a pendant first coreactive group which can be reacted with a compound containing a second coreactive group and a phosphorous acid group. Suitable first coreactive groups on the precursor polymer are hydroxyl, epoxy, acetoacetoxy and isocyanate groups. For example, one could prepare a precursor polymer using hydroxy alkyl (meth)acrylate, glycidyl (meth)acrylate, acetoacetoxy (meth)acrylate, or α,α-dimethyl meta isopropenyl benzyl isocyanate. Suitable second coreactive groups on the compound including a second coreactive group and phosphorous acid group are amine, hydroxyl, and phosphoric acid anhydride. Alternatively, a hydroxyl functional precursor polymer can be reacted with polyphosphoric acid to generate the organic polymer with internal pendant phosphorous acid groups. An epoxy functional precursor polymer can be reacted with polyphosphoric acid, or glyphosate to generate the organic polymer with internal pendant phosphorous acid groups. An isocyanate or acetoacetoxy functional precursor polymer can be reacted with an amine functional phosphonate such as glyphosate, to generate the organic polymer with internal pendant phosphorous acid groups.

The calculated glass transition temperature ("Tg") of the emulsion polymer is typically from −65° C. to 105° C., or in the alternative, from −25° C. to 35° C. Tgs of the polymers are calculated herein by using the Fox equation (T. G. Fox, Bull.

Am. Physics Soc., Volume 1, Issue No. 3, page 123(1956)). that is, for calculating the Tg of a copolymer of monomers M1 and M2, $1/Tg(\text{calc.}) = w(M1)/Tg(M1) + w(M2)/Tg(M2)$, wherein Tg(calc.) is the glass transition temperature calculated for the copolymer w(M1) is the weight fraction of monomer M1 in the copolymer w(M2) is the weight fraction of monomer M2 in the copolymer Tg(M1) is the glass transition temperature of the homopolymer of M1

Tg(M2) is the glass transition temperature of the homopolymer of M2, all temperatures being in ° K.

The glass transition temperature of homopolymers may be found, for example, in "Polymer Handbook", edited by J. Brandrup and E. H. Immergut, Interscience Publishers.

The average particle diameter of the emulsion polymer particles is typically from 30 nanometers to 500 nanometers, as measured by a Brookhaven Model BI-90 Particle Sizer supplied by Brookhaven Instrument Corp., Holtsville, N.Y.

The organic polymer of this invention and the phosphorous acid group-containing emulsion polymer used in certain compositions and processes of this invention contain internal pendant phosphorous acid groups. The weight percent of phosphorous present in the organic polymer or the emulsion polymer containing internal pendant phosphorous acid groups is based on the total weight of the organic polymer or the emulsion polymer. The weight percent of phosphorous was determined from the weight percent of phosphorous in the phosphorous acid group containing monomer used to prepare the organic polymer. For example, phosphoethyl methacrylate contains 14.8% by weight of phosphorus, and an organic polymer containing 10% copolymerized phosphoethyl methacrylate would contain 1.48% phosphorus based on the total weight of the organic polymer. A similar calculation can be used to determine the weight percent of pendant phosphorous acid groups by weight based on the weight of the emulsion polymer.

When the weight percent of phosphorous in the phosphorous acid group containing monomer used in the preparation of the organic polymer or the emulsion polymer is not known, the weight percent of internal pendant phosphorous acid groups can be determined by a combination of chromatography, centrifugation, and phosphorus-31 NMR. The emulsion polymer, organic polymer, and serum are first separated using appropriate centrifugation and size exclusion chromatography. The total phosphorous is then determined by phosphorus-31 NMR.

In some embodiments of the compositions and processes of the present invention, an organic polymer including phosphorous acid groups at a level of >0.25% phosphorus by weight based on the weight of the organic polymer, the organic polymer having an acid number of from 50 to 1,000, and the organic polymer having a Mw of from 1,000 to 75,000, is included. In this case, the organic polymer may be formed by emulsion, inverse emulsion, mini emulsion, bulk, solution, hot tube, suspension, or inverse suspension polymerization processes.

In another embodiment the organic polymer of this invention can be employed as an emulsifier in the emulsion polymerization of ethylenically unsaturated monomers. The organic polymers can function as stabilizers (i.e., dispersants) in emulsion polymerizations according to the methods known for using "high acid" polymeric stabilizers (often referred to as "resin-supported polymerization", as disclosed in U.S. Pat. Nos. 4,845,149 and 6,020,061). The organic polymer of this invention can be employed as the soluble portion of a soluble shell polymer as is disclosed in U.S. Pat. No. 4,916,171. Alternately this material can be used for an inverse soluble shell polymer or resin supported emulsion polymerization.

In one embodiment of the present invention, there are provided certain aqueous compositions including the organic polymer of the invention, the emulsion polymer containing pendant phosphorous acid groups and, optionally, an inorganic particle, which compositions may find utility as aqueous coating compositions. The amount of inorganic particles included in the aqueous coating composition is from 0 to 95 volume %, based on the total dry volume of the aqueous composition and inorganic particles. Typically, the aqueous coating composition of this invention, when used to prepare dried coatings, has a solids level in the range of from 20 to 50 volume %, based on the volume of the aqueous composition. The pH of the aqueous composition is typically in the range of from 3 to 11, and preferably, in the range of from 7 to 10. A suitable viscosity range for the aqueous composition is from 50 to 130 Kreb units (KU), preferably from 70 to 120 KU, and more preferably from 90 to 110 KU.

Inorganic particles include: metal oxides such as zinc oxide, cerium oxide, tin oxide, antimony oxide, zirconium oxide, chromium oxide, iron oxide, lead oxide, aluminum oxide, silicon oxide, titanium dioxide; zinc sulfide, lithopone, calcium carbonate, calcium sulfate, barium sulfate, mica, clay, calcined clay, feldspar, nepheline syenite, wollastonite, diatomaceous earth, alumina silicates, and talc. In one embodiment, the inorganic particles may have a particle size which is from 1 to 100 nm, preferably from 1 to 50 nm. Examples of desired inorganic particles with a particle size of less than 100 nm include zinc oxide, silicon oxide, titanium dioxide, and iron oxide.

The aqueous composition may optionally contain organic pigment particles. Suitable organic pigments also include plastic pigments such as solid bead pigments and microsphere pigments containing voids or vesicles. Examples of solid bead pigments include polystyrene and polyvinyl chloride beads. Examples of microsphere pigments, which include polymer particles containing one or more voids include Ropaque™ opaque polymer Polymers and vesiculated polymer particle, as disclosed in U.S. Pat. No. 4,427,835; U.S. Pat. No. 4,920,160; U.S. Pat. No. 4,594,363; U.S. Pat. No. 4,469,825; U.S. Pat. No. 4,468,498; U.S. Pat. No. 4,880,842; U.S. Pat. No. 4,985,064; U.S. Pat. No. 5,157,084; U.S. Pat. No. 5,041,464; U.S. Pat. No. 5,036,109; U.S. Pat. No. 5,409,776; and U.S. Pat. No. 5,510,422. Other suitable pigments include, for example, Expancel™ 551 DE20 acrylonitrile/vinyl chloride expanded particles (Expancel Inc. Duluth Ga.); Sil-Cell™ 35/34 a sodium potassium aluminum silicate particles (Silbrico Corporation, Hodgkins Ill.); Dualite™ 27 polyvinylidene chloride copolymer coated with CaCO$_3$ (Pierce and Stevens Corporation, Buffalo N.Y.); Fillitte™ 150 ceramic spherical particles (Trelleborg Fillite Inc. Norcross Ga.); Microbeads™ 4A soda lime particles (Cataphote Inc.); Sphericell™ hollow glass particles (Potter Industries Inc. Valley Forge Pa.); Eccosphere™ hollow glass spheres (New Metals & Chemicals Ltd.; Essex England); Z-light™ Sphere W-1200 ceramic hollow spheres (3M St. Paul Minn.); Scotchlite™ K46 glass bubbles (3M St. Paul Minn.); Vistamer™ UH 1500 polyethylene particles; and Vistamer™ HD 1800 polyethylene particles (Fluoro-Seal Inc., Houston Tex.).

The aqueous compositions including inorganic particles are prepared by techniques which are well known in the coatings art. First, the inorganic particles are typically are well dispersed in the presence of the organic polymer in an aqueous medium under high shear such as is afforded by a COWLES (R) mixer. Then, in embodiments including an emulsion polymer, an emulsion polymer including pendant phosphorous acid groups is added under low shear stirring along with other coatings adjuvants as desired. The aqueous composition may contain, in addition to the emulsion polymer including pendant phosphorous acid groups and optional pigment(s), film-forming or non-film-forming solution or other emulsion polymers in an amount of 0% to 200% by weight of the emulsion polymer including pendant phosphorous acid groups, and conventional coatings adjuvants such as, for example, emulsifiers, coalescing agents (coalescents), plasticizers, antifreezes, curing agents, buffers, neutralizers, thickeners, rheology modifiers, humectants, wetting agents, biocides, plasticizers, antifoaming agents, UV absorbers, fluorescent brighteners, light or heat stabilizers, biocides, chelating agents, dispersants, colorants, waxes, water-repellants, and anti-oxidants.

The aqueous composition optionally contains a volatile organic compound ("VOC"). A VOC is defined herein as a carbon containing compound that has a boiling point below 280° C. at atmospheric pressure. Water and ammonia are excluded from VOCs. Frequently a VOC is deliberately added to a paint or coating to improve the film properties of a coating or to aid in the application properties of the composition employed to prepare the coating. Examples are glycol ethers, organic esters, aromatic compounds, ethylene and propylene glycol, and aliphatic hydrocarbons.

In one embodiment, the aqueous composition contains up to 20 weight % VOC by weight based on the total weight of the aqueous coating composition; preferably the aqueous coating composition contains less than 5% VOC by weight based on the total weight of the aqueous coating composition; more preferably the aqueous coating composition contains less than 3% VOC by weight based on the total weight of the aqueous coating composition; even more preferably the aqueous coating composition contains less than 1.7% VOC by weight based on the total weight of the aqueous coating composition.

Typical methods of aqueous paint or coating preparation introduce adventitious VOCs from the preparation of the aqueous composition, biocides, defoamers, soaps, dispersants, and thickeners. These typically account for 0.2% VOC by weight based on the total weight of the aqueous coating composition. Additional methods such as steam stripping and choice of low VOC containing additives like biocides, defoamers, soaps, dispersants, and thickeners are suitable for further reducing the aqueous coating composition to less than 0.05% VOC by weight based on the total weight of the aqueous coating composition. In one embodiment, the aqueous coating composition has less than 0.1% VOC by weight based on the total weight of the aqueous coating composition.

Additionally, the low VOC aqueous coating composition optionally contains coalescing agents that are not VOCs. A coalescing agent is a compound that is added to a water-borne emulsion polymer, paint, or coating, which reduces the minimum film forming temperature (MFFT) of the emulsion polymer, paint or coating by at least 1° C. The MFFT is measured using ASTM test method D2354. A non-VOC coalescing agent is a coalescing agent which has a boiling point above 280° C. at atmospheric pressure. Examples of coalescing agents that are not VOCs include plasticizers, low molecular weight polymers, surfactants, and autooxidizable plasticizers such as alkyl esters of unsaturated fatty acids. Preferred are alkyl esters prepared from oils such as linseed, tung, dehydrated castor, soybean, tall, sunflower, and corn. Examples of non-VOC coalescing agents include esters of unsaturated fatty acids, such as mono, di-, or tri-unsaturated fatty acids. Suitable unsaturated fatty acid esters include monounsaturated fatty acid esters formed from palmitoleic acid, oleic acid, or caproleic acid; diunsaturated fatty acid esters formed from linoleic acid; triunsaturated fatty acid esters formed from linolenic acid or eleosteric acid, or mixtures thereof. Suitable esters of unsaturated fatty acids includes alkyl esters such as, such as methyl and ethyl esters; substituted alkyl esters, such as esters formed from ethylene glycol and propylene glycol; and alkyl ether esters of unsaturated fatty acids, diethylene glycol, triethylene glycol, dipropylene glycol, tripropylene glycol, and diethylene glycol monobutyl ether. In one embodiment, the above auto autooxidizable plasticizers are used in conjunction with an aqueous composition contains 0.25% to 12.5% of acetoacetoxyethyl (meth) acrylate as polymerized units. Auto oxidation can further be enhanced by the use of metal ion catalysts such as cobalt, zirconium, calcium, manganese, copper, zinc and iron. Simple salts such as halides, nitrates, and sulfates may be used but in many cases an organic anion such as the acetate, naphthenate or acetoacetonate is used.

Conventional coatings application methods such as, for example, brushing, rolling, and spraying methods such as, for example, air-atomized spray, air-assisted spray, airless spray, high volume low pressure spray, and air-assisted airless spray may be used to apply the aqueous composition of this invention. Additionally, for some systems, other application techniques may be used to apply the aqueous polymer composition, such as, caulk gun, roll coaters, and curtain coaters. The aqueous polymer composition may be advantageously applied to substrates such as, for example, plastic, wood, metal, primed surfaces, previously painted surfaces, weathered painted surfaces, glass, composites, and cementitious substrates. Drying is typically allowed to proceed under ambient conditions such as, for example, at 0° C. to 35° C. but may be accelerated with heat or low humidity.

Abbreviations Used

| | |
|---|---|
| Butyl acrylate | BA |
| Butyl methacrylate | BMA |
| Methyl methacrylate | MMA |
| Methacrylic acid | MAA |
| Phosphoethyl methacrylate | PEM |
| Methyl 3-mercaptopropionate | MMP |
| Ureido methacrylate | UMA |
| Surfactant A | Alkylpolyethoxyphosphate, ammonium salt (25%) |
| tButyl hydroperoxide (70%) | tBHP |
| Isoascorbic acid | IAA |
| 1-Dodecanethiol | DDM |
| Deionized water | DI water |

EXPERIMENTAL METHODS

Example A

Synthesis of an Emulsion Polymer with Pendant Phosphate Groups as Described in U.S. Pat. No. 6,818,697

A 5-liter, four necked round bottom flask was equipped with paddle stirrer, thermometer, nitrogen inlet and condenser. A mixture of 29.0 g of Surfactant A, 6.6 g ammonium bicarbonate, 88.9 g of an acrylic polymer emulsion (100 nm, 45% solids), and 700 g DI water was added to the kettle and heated to 80° C. under a nitrogen atmosphere. A monomer emulsion (ME) was prepared by mixing 680 g DI water, 64.5 g Surfactant A, 940 g BA, 976 g MMA, 5 g DDM, and 64 g PEM (61 wt % active) and 40 g of 50% UMA. With the kettle water at 80° C., the following materials were added in order: a mixture of 25 g 0.1% iron sulfate solution and 1.7 g 1% versene solution, a solution of 0.50 grams of t-BHP in 10 g DI water, and a solution of 0.25 g IAA in 10 g water. The ME was added to the kettle at 80° C. Two cofeed solutions (3.9 g of 70% t-BHP in 99 g DI water and 2.6 g IAA in 90 g DI water) were gradually added along with the monomer emulsion addition. When half the ME was added to the kettle, ammonium hydroxide (28%, 10.9 grams) was added to the IAA cofeed solution. After the completion of the monomer addition, the ME container was rinsed with 30.0 g DI water. A solution of 0.27 grams of 70% t-BHP in 5 g water was added, followed by a solution of 0.17 g IAA in 5 g water. The dispersion was then cooled 60° C. While the reaction mixture was allowed to continue to cool, two solutions (0.82 g 70% t-BHP in 10 g DI water and 0.54 g IAA in 15 g DI water) were then added over 15 minutes. After the addition of a solution of 18.8 g 28% ammonium hydroxide in 20 g DI water, the dispersion was filtered to remove any coagulum. The filtered dispersion had a pH of 8.1, and 52.7% solids content. Examination of the dispersion with CHDF showed that it has two distinctive modes (55% at 90 nm and 45% at 206 nm by weight). Example B1 contained 0.234 weight percent of phosphorous present as internal pendant phosphorous acid groups.

Comparative Example A

Comparative Example A is Tamol® 165A as supplied from Rohm and Haas Company (Philadelphia Pa.). It is a dispersant which contains no pendant phosphorous acid groups.

Comparative Example B

Preparation of Organic Polymer Via Solution Polymerization

A 5-liter, four-necked round bottom flask was equipped with paddle stirrer, thermometer, nitrogen inlet and condenser. The reactor was charged with 2000 g isopropyl alcohol and heated to an initial temperature of 79° C. A monomer mixture was prepared by blending 450 g BMA, 150 g PEM (50 wt % active), 150 g MAA, 26.3 g MMP, and 250 g isopropyl alcohol. A catalyst mixture was prepared by blending 20 g t-butyl peroxypivalate (75% active, Trigonox™ 25-C75 from Akzo Nobel) with 27.5 g isopropyl alcohol. The monomer mixture and the catalyst mixture were co-fed to the reactor over one hour while maintaining the batch temperature at 79° C. At the completion of the monomer feed, a blend of 20 g t-butyl peroxypivalate (75% active) with 27.5 g isopropyl alcohol was fed to the reactor over one hour while maintaining the batch temperature at 79° C. Then, the batch was held at 79° C. for two hours. The batch was cooled to room temperature and then diluted by adding 3100 g DI water. The batch was then neutralized to pH 9 with aqueous ammonium hydroxide (28%). The isopropyl alcohol was removed by distillation using a rotary evaporator device. The final solids of the aqueous solution of organic polymer was adjusted to 25%. The Mw was 22,000. Comparative Example B contained 1.46 weight percent of phosphorous present as internal pendant phosphorous acid groups Comparative Example C A monomer emulsion was prepared by mixing 647 g DI water, 54 g (30% Active) anionic surfactant, 40 g MMP, 1003 g BMA, and 615 g MAA. The reactor was a 5-liter, four-necked round bottom flask equipped with a paddle stirrer, a thermometer, nitrogen inlet, and a reflux condenser. To the flask was added 930 g DI water and 54 g (30% Active) anionic surfactant. The contents of the flask were heated to 82° C. under a nitrogen atmosphere. Next, a solution containing 1.94 g sodium persulfate dissolved in 20 g DI water, and a rinse of 5 g DI water was added. After stirring the contents of the flask for 2 minutes, the remaining monomer emulsion and an initiator solution containing 4.04 g sodium persulfate and 5.0 g sodium acetate in 130 g DI water were added separately to the flask over 1.5 hours. The contents of the flask were maintained at a temperature of 82° C. during the addition of the monomer emulsion. When all additions were complete, the containers were rinsed with 100 g DI water, which was then added to the flask. Next, a catalyst/activator pair was added to the contents of the flask. The batch was then cooled to room temperature. An 80 g portion of the latex was diluted with 120 g water and neutralized with aqueous ammonia (29%) to raise the pH to 9, dissolving the latex particles. Previous to dissolution the polymer composition was an aqueous polymer dispersion containing copolymer particles with an average particle diameter of 112 nm, and had a solids content of 44 weight %. Comparative Example C contained 0 weight percent of phosphorous present as internal pendant phosphorous acid groups Comparative Example D Sipomer® PAM 100 is a monomer sold by Rhodia as Phosphate Ester of Polyethylene Glycol Monomethacrylate. It is an example of Phosphate Ester where there are more than three ($C_2H_4O$) spacers between the methacrylate group and the phosphate group.

A monomer emulsion was prepared by mixing 648 g DI water, 53.9 g (30% Active) anionic surfactant, 162 g Sipomer® PAM 100 (77% Active), 41.2 g MMP, 1003 g BMA, and 453 g MAA. The reactor was a 5-liter, four-necked round bottom flask equipped with a paddle stirrer, a thermometer, nitrogen inlet, and a reflux condenser. To the flask was added 930 g DI water and 53.9 g surfactant A. The contents of the flask were heated to 82° C. under a nitrogen atmosphere. Next, a solution containing 3.2 g sodium persulfate dissolved in 20 g DI water, and a rinse of 5 g DI water was added. After stirring for 2 minutes, the remaining monomer emulsion and an initiator solution containing 2.7 g sodium persulfate and 5 g sodium acetate in 130 g DI water were added separately to the flask over 1.5 hours. The contents of the flask were maintained at a temperature of 82° C. during the addition of the monomer emulsion. When all additions were complete, the containers were rinsed with 100 g DI water, which was then added to the flask. Next, a catalyst/activator pair was added to the contents of the flask. The batch was then cooled to room temperature. An 80 g portion of the latex was diluted with 120 g water and neutralized with aqueous ammonia (29%) to raise the pH to 9, completely dissolving the latex particles. Previous to dissolution the polymer was an aqueous polymer dispersion containing copolymer particles with an average particle diameter of 242 nm, and had a solids content of 44.1 weight %. Comparative Example D contained 0.554 weight percent of phosphorous present as internal pendant phosphorous acid groups.

Comparative Example E

The protective colloid described in U.S. Pat. No. 6,218,456 was prepared following the procedure outlined for Example 1 of that patent (Columns 5 and 6). Comparative Example E contained 4.30 weight percent of phosphorous present as internal pendant phosphorous acid groups. Examples 1-6 were prepared in a reactor which was a 5-liter, four-necked round bottom flask equipped with a paddle stirrer, a thermometer, nitrogen inlet, and a reflux condenser.

Example 1

Preparation of Organic Polymer

A monomer emulsion was prepared by mixing 648 g DI water, 53.9 g (30% Active) anionic surfactant, 162 g PEM (50% Active), 41.2 g MMP, 1003 g BMA, and 453 g MAA. To the flask was added 930 g DI water and 53.9 g Surfactant A. The contents of the flask were heated to 82° C. under a nitrogen atmosphere. Next, a solution containing 1.94 g sodium persulfate dissolved in 20 g DI water, and a rinse of 5 g DI water was added. After stirring the contents of the flask for 2 minutes, the remaining monomer emulsion and an initiator solution containing 4.04 g sodium persulfate and 5 g of sodium acetate in 130 g DI water were added separately to the flask over 1.5 hours. The contents of the flask were maintained at a temperature of 82° C. during the addition of the monomer emulsion. When all additions were complete, the containers were rinsed with 100 g DI water, which was then added to the flask. Next, a catalyst/activator pair was added to the contents of the flask. The batch was then cooled to room temperature. An 80 g portion of the latex was diluted with 120 g water and neutralized with aqueous ammonia (29%) to raise the pH to 9, dissolving the latex particles. Previous to dissolution, the polymer was an aqueous polymer dispersion containing copolymer particles with an average particle diameter of 111 nm, and had a solids content of 44.1 weight %.

Example 2

Preparative of Organic Polymer

A monomer emulsion was prepared by mixing 435 g DI water, 36.22 g (30% active) anionic surfactant, 109 g PEM (50% active), 38.0 g MMP, 674 g BMA, and 304 g MAA. To the flask was added 1800 g DI water and 36.22 g (30% active) anionic surfactant. The contents of the flask were heated to 82° C. under a nitrogen atmosphere. Next, a solution containing 2.17 g sodium persulfate dissolved in 20 g DI water, and a rinse of 5 g DI water was added. After stirring the contents of the flask for 2 minutes, the remaining monomer emulsion and an initiator solution containing 1.81 g sodium persulfate and 3.4 g of sodium acetate in 130 g DI water were added separately to the flask over 1.5 hours. The contents of the flask were maintained at a temperature of 82° C. during the addition of the monomer emulsion. When all additions were complete, the containers were rinsed with 100 g DI water, which was then added to the flask. Next, a catalyst/activator pair was added to the contents of the flask. The batch was then cooled to room temperature. An 80 g portion of the latex was diluted with 120 g DI water and neutralized with aqueous ammonia (29%) to raise the pH to 9, dissolving the latex particles. Previous to dissolution, the polymer was an aqueous polymer dispersion containing copolymer particles with an average particle diameter of 81 nm, and had a solids content of 27.1 wt %.

Example 3

Preparation of Organic Polymer

The procedure of Example 2 was followed except a monomer emulsion was prepared by mixing 435 g DI water, 36.22 g (30% active) anionic surfactant, 217 g PEM (50% active), 28 g MMP, 674 g BMA, and 200 g MAA was used. Previous to dissolution, the polymer was an aqueous polymer dispersion containing copolymer particles with an average particle diameter of 74 nm, and had a solids content of 27.2 weight %.

Example 4

Preparation of Organic Polymer

The procedure of Example 2 was followed except a monomer emulsion was prepared by mixing 435 g DI water, 36.22 g (30% active) anionic surfactant, 109 g PEM (50% active), 51.3 g butyl mercaptopropionate, 674 g BMA, and 304 g MAA was used. Previous to dissolution the polymer was an aqueous polymer dispersion containing copolymer particles with an average particle diameter of 83 nm, and had a solids content of 29.5 weight %.

Example 5

Preparation of Organic Polymer

A monomer emulsion was prepared by mixing 647 g DI water, 54 g (30% active) anionic surfactant, 162 g PEM (50% active), 16 g MMP, 1003 g BMA, and 452 g MAA. To the flask was added 1360 g DI water and 53.93 g (30% active) anionic surfactant. The contents of the flask were heated to 82° C. under a nitrogen atmosphere. Next, a solution containing 3.23 g sodium persulfate dissolved in 20 g DI water, and a rinse of 5 g DI water was added. After stirring the contents of the flask for 2 minutes, the remaining monomer emulsion and an initiator solution containing 2.70 g sodium persulfate and 5.0 g of sodium acetate in 130 g DI water were added separately to the flask over 1.5 hours. The contents of the flask were maintained at a temperature of 82° C. during the addition of the monomer emulsion. When all additions were complete, the containers were rinsed with 100 g DI water, which was then added to the flask. Next, a catalyst/activator pair was added to the contents of the flask. The batch was then cooled to room temperature. An 80 g portion of the latex was diluted with 120 g of water and neutralized with aqueous ammonia (29%) to raise the pH to 9, dissolving the latex particles. Previous to dissolution, the polymer was an aqueous polymer dispersion containing copolymer particles with an average particle diameter of 94 nm, and had a solids content of 40 weight %.

Example 6

Preparative of Organic Polymer

A monomer emulsion was prepared by mixing 435 g DI water, 36.2 g (30% active) anionic surfactant, 217 g PEM (50% Active), 53 g MMP, 674 g BMA, and 196 g MAA. To the flask was added 1800 g DI water and 36.2 g surfactant A. The contents of the flask were heated to 82° C. under a nitrogen atmosphere. Next, a solution containing 2.17 g sodium persulfate dissolved in 20 g DI water, and a rinse of 5 g DI water was added. After stirring the contents of the flask for 2 minutes, the remaining monomer emulsion and an initiator solution containing 1.8 g sodium persulfate and 3.4 g sodium acetate in 100 g DI water were added separately to the flask over 1.5 hours. The contents of the flask were maintained at a temperature of 82° C. during the addition of the monomer emulsion. When all additions were complete, the containers were rinsed with 92 g DI water, which was then added to the flask. Next, a catalyst/activator pair was added to the contents of the flask. The batch was then cooled to room temperature. An 80 g portion of the latex was diluted with 120 g water and neutralized with aqueous ammonia (29%) to raise the pH to 9. Previous to pH adjustment, the polymer was an aqueous polymer dispersion containing copolymer particles with an average particle diameter of 107 nm, and had a solids content of 28 weight %.

TABLE 6.1

Characterization of Organic Polymers

| Example | Mw | Total Acid No. | Acid No from PEM | % P Note (1) |
|---|---|---|---|---|
| 1 | 8900 | 204 | 26 | 0.739 |
| 2 | 5900 | 201 | 26 | 0.740 |
| 3 | 16400 | 172 | 53 | 1.47 |
| 4 | 10500 | 209 | 27 | 0.740 |
| 5 | 25200 | 209 | 27 | 0.739 |
| 6 | 9700 | 171 | 53 | 1.47 |

Note (1) Weight percent phosphorous present as internal pendant phosphorous acid groups Example 7

Preparation of Aqueous Compositions

A $TiO_2$ pigment dispersion was prepared by adding the ingredients of Table 7.1 in the order listed with stirring. In a 500 ml cylindrical container (9 cm diameter by 11 cm tall) the agitator blade was positioned 1 cm up from the bottom of the container. The ingredients of Table 7.2 were added to the container in the order specified with the blade rotating at 150 rpm. The emulsion polymer (232.6 g) was poured into the container. The pigment dispersion was poured into the container over a 10 second period. Immediately after adding the dispersion, the distance between the blade and the bottom of the container was increased to 2 cm. One minute after the addition of the dispersion was begun, the agitator speed was raised to 500 rpm for 5 minutes. After 5 minutes, the speed of the agitator was increased to 1100 rpm for an additional 5 minutes. After mixing, the aqueous composition was drawn down using a wet film applicator and allowed to dry. The dried film was rated for grit (flocculated pigment) using a 1 to 5 scale where 1=large amount of grit particles to 5=no grit. A rating of 3.5 or higher was considered acceptable

TABLE 7.1

Pigment Dispersion Composition

| | Grams |
|---|---|
| Kronos ® 4311 (Kronos Inc. - Houston TX) | 143.14 |
| Foamstar ® A-34 (Cognis Corp. - Cincinnati OH) | 0.50 |
| Triton ™ CF-10 (Dow Chemical Company - Midland MI) | 0.50 |
| AMP-95 ™ (Dow Chemical Company - Midland MI) | 0.25 |
| Organic Polymer of Example 1-6 or Comparative Examples A-E at 1% by weight on dry weight of Kronos ® 4311 | |

TABLE 7.2

Let Down Ingredients

| | |
|---|---|
| Water | 105.2 |
| Ethylene Glycol | 4.50 |
| Foamstar ® A-34 (Cognis Corp. - Cincinnati OH) | 0.50 |
| Texanol ™ (Eastman Chemical Company - Kingsport TN) | 4.84 |

TABLE 7.2-continued

Let Down Ingredients

| | |
|---|---|
| Triton ™ X-100 (Dow Chemical Company - Midland MI) | 1.50 |
| Acrysol ® SCT-275 (Rohm and Haas Company - Philadelphia PA) | 4.20 |
| Acrysol ® RM-2020 (Rohm and Haas Company - Philadelphia PA) | 11.92 |
| Emulsion Polymer (Example A) (No emulsion polymer for Comp. Example E) | 232.59 |

TABLE 7.3

Grit Evaluation of Aqueous Compositions

| Example | Grit |
|---|---|
| 1 | 5.0 |
| 2 | 4.5 |
| 3 | 4.5 |
| 4 | 4.5 |
| 5 | 4.0 |
| 6 | 5.0 |
| Comparative A | 1.0 |
| Comparative B | 3.0 |
| Comparative C | Coating gelled during preparation |
| Comparative D | 1.0 |
| Comparative E | 1.0 |

The results show that the organic polymers of this invention (Examples 1-6) exhibit performance superior to the phosphorous acid group-free organic polymer (Comparative Example A), the solution-polymerized organic polymer (Comparative Example B), the organic polymer without pendant phosphate groups (Comparative Example C), the organic polymer prepared with a phosphate monomer with more than three ethylene oxide spacer units (Comparative Example D), and the organic polymer used as a protective colloid in an emulsion polymerization (Comparative Example E).

What is claimed is:

1. An aqueous composition comprising an inorganic particle;
    an organic polymer comprising phosphorous acid groups at a level of >0.25% phosphorus by weight based on the weight of said organic polymer, said phosphorus acid groups being separated from the backbone of said organic polymer by no more than 2 alkylene glycol units, said organic polymer having an acid number of from 50 to 1,000, and said organic polymer having a Mw of from 2,000 to 20,000, wherein said organic polymer has been formed by emulsion polymerization from at least one ethylenically unsaturated monomer; wherein said organic polymer is present at a level of from 0.2 to 10% by weight based on the weight of said inorganic particle; and
    an emulsion polymer comprising from 0.05% to 2% phosphorous, present as pendant phosphorous acid groups, by weight based on the weight of said emulsion polymer, wherein said organic polymer is present at a level of from 0.1% to 50% by weight based on the total weights of said organic polymer and said emulsion polymer;
    wherein said inorganic particle in an aqueous medium has been first contacted with said organic polymer and subsequently said emulsion polymer has been added to form said aqueous composition; and wherein the pH of said aqueous composition is in the range of from 3 to 11.

2. A process for forming an aqueous composition comprising:
  a) providing an inorganic particle;
  b) contacting said inorganic particle in an aqueous medium with an organic polymer comprising phosphorous acid groups at a level of >0.25% phosphorus by weight based on the weight of said organic polymer, said phosphorus acid groups being separated from the backbone of said organic polymer by no more than 2 alkylene glycol units, said organic polymer having an acid number of from 50 to 1,000, and said organic polymer having a Mw of from 2,000 to 20,000, wherein said organic polymer has been formed by emulsion polymerization from at least one ethylenically unsaturated monomer; wherein said organic polymer is present at a level of from 0.2 to 10% by weight based on the weight of said inorganic particle; and c) subsequently adding an emulsion polymer comprising from 0.05% to 2% pendant phosphorous acid groups by weight based on the weight of said emulsion polymer,
  wherein said organic polymer is present from 0.1% to 50% of said composition based on the total weights of said organic polymer and said emulsion polymer; and wherein the pH of said aqueous composition is in the range of from 3 to 11.

* * * * *